US009157358B2

(12) United States Patent
Beckmann et al.

(10) Patent No.: US 9,157,358 B2
(45) Date of Patent: Oct. 13, 2015

(54) EXHAUST GAS SYSTEM OF AN INTERNAL COMBUSTION ENGINE, AND METHOD FOR PREPARING A REDUCING AGENT WHICH IS INTRODUCED INTO THE INTERNAL COMBUSTION ENGINE EXHAUST GAS (71) Applicant: Daimler AG, Stuttgart (DE)

(72) Inventors: Thomas Beckmann, Stuttgart (DE); Tillmann Braun, Berglen (DE); Frank Duvinage, Holzmaden (DE); Helmut Herwig, Waiblingen (DE); Bernhard Kobiela, Walheim (DE); Peter Lueckert, Berglen (DE); Antonio Pepe, Stuttgart (DE); Peter Raitschev, Stuttgart (DE); Joachim Schommers, Allmersbach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/371,914

(22) PCT Filed: Jan. 11, 2013

(86) PCT No.: PCT/EP2013/000067
§ 371 (c)(1),
(2) Date: Jul. 11, 2014

(87) PCT Pub. No.: WO2013/104544
PCT Pub. Date: Jul. 18, 2013

(65) Prior Publication Data
US 2015/0047324 A1 Feb. 19, 2015

(30) Foreign Application Priority Data
Jan. 14, 2012 (DE) .......................... 10 2012 000 597

(51) Int. Cl.
*F01N 3/24* (2006.01)
*F01N 3/28* (2006.01)
*F01N 3/20* (2006.01)

(52) U.S. Cl.
CPC *F01N 3/28* (2013.01); *F01N 3/208* (2013.01); *F01N 3/2066* (2013.01);
(Continued)

(58) Field of Classification Search
CPC ......... F01N 1/086; F01N 1/087; F01N 1/088; F01N 1/12; F01N 3/2892; F01N 2470/18
See application file for complete search history.

(56) References Cited

U.S. PATENT DOCUMENTS 7,975,472 B2 7/2011 Halbei et al.
2005/0178111 A1* 8/2005 Kammel ......................... 60/289
(Continued)

FOREIGN PATENT DOCUMENTS

DE 10 2006 043 225 A1 3/2008
DE 10 2007 052 262 A1 5/2009
DE 10 2009 041 345 A1 4/2011
EP 2 123 873 A1 11/2009
(Continued)

OTHER PUBLICATIONS

International Search Report dated Aug. 1, 2013 (Two (2) pages).
(Continued)

*Primary Examiner* — Audrey K Bradley
*Assistant Examiner* — Jonathan Matthias
(74) *Attorney, Agent, or Firm* — Crowell & Moring LLP (57) ABSTRACT An exhaust gas system includes a reducing agent preparation section having a first cylindrical exhaust gas line pipe section opening approximately perpendicularly into a second exhaust gas line pipe section via an opening in a cylinder lateral surface of the second exhaust gas line pipe section. An injector unit for introducing the reducing agent into the exhaust gas is situated at the first exhaust gas line pipe section, upstream from the opening. The opening in the cylinder lateral surface of the second exhaust gas line pipe section has a larger extension in the direction of the longitudinal extent of the second exhaust gas line pipe section than transversely thereto. In a method using the reducing agent preparation section a rotating exhaust gas flow is formed within the second exhaust gas line pipe section.

15 Claims, 4 Drawing Sheets (52) U.S. Cl.
CPC ........ *F01N 2470/18* (2013.01); *F01N 2610/02* (2013.01); *F01N 2610/102* (2013.01); *F01N 2610/1453* (2013.01); *Y02T 10/24* (2013.01)

(56) References Cited

U.S. PATENT DOCUMENTS

| | | |
|---|---|---|
| 2008/0216470 A1 | 9/2008 | Sedlacek et al. |
| 2012/0023914 A1* | 2/2012 | Omote et al. .................... 60/295 |
| 2013/0098004 A1* | 4/2013 | Levin et al. ..................... 60/295 |

FOREIGN PATENT DOCUMENTS

| | | | |
|---|---|---|---|
| EP | 2 395 211 A1 | 12/2011 | |
| JP | 2009-228484 A | 10/2009 | |
| WO | WO 2010089924 A1 * | 8/2010 | ............... F01N 3/08 |

OTHER PUBLICATIONS

German-language Written Opinion (PCT/ISA/237) dated Aug. 1, 2013 (Eight (8) pages).

* cited by examiner

EXHAUST GAS SYSTEM OF AN INTERNAL COMBUSTION ENGINE, AND METHOD FOR PREPARING A REDUCING AGENT WHICH IS INTRODUCED INTO THE INTERNAL COMBUSTION ENGINE EXHAUST GAS

BACKGROUND AND SUMMARY OF THE INVENTION

Exemplary embodiments of the invention relate to an exhaust gas system of an internal combustion engine, which for routing exhaust gas has a first cylindrical exhaust gas line pipe section and a second cylindrical exhaust gas line pipe section, whereby exhaust gas enriched with the reducing agent is transferable from the first exhaust gas line pipe section into the second exhaust gas line pipe section. The invention further relates to a method for preparing a reducing agent that is introduced into an exhaust gas system of an internal combustion engine.

For exhaust gas aftertreatment, reducing agents that are liquid in the starting state, such as mineral oil fuel or aqueous urea solution, are often introduced into the exhaust gas of internal combustion engines. The preparation of the reducing agent introduced in the liquid state is problematic with regard to a uniform distribution to be achieved, and evaporation. With aqueous urea solution, there is the additional problem of releasing the ammonia, which is necessary for the selective catalytic reduction of nitrogen oxides, from the urea by hydrolysis and/or thermolysis. To solve this problem, a number of exhaust gas system variants having preparation sections, mixers, evaporators, and hydrolysis catalytic converters have been proposed. Despite the numerous proposed solutions, there is still a need for improvement with regard to the preparation of reducing agents in the liquid state, and which are introduced into the exhaust gas.

Exemplary embodiments of the invention, therefore, provide a device and a method by means of which the best possible preparation of reducing agent that is introduced into exhaust gas of an internal combustion engine is made possible.

The exhaust gas system according to the invention has a first cylindrical exhaust gas line pipe section and a second cylindrical exhaust gas line pipe section for routing exhaust gas. An injector unit for introducing a reducing agent into exhaust gas flowing through the first exhaust gas line pipe section is situated at the first exhaust gas line pipe section. The second exhaust gas line pipe section has a cylinder lateral surface, a closed first end, and an open second end, as well as an opening in the cylinder lateral surface adjacent to the closed end. An open end of the first exhaust gas line pipe section is connected in a positive-fit manner to the second exhaust gas line pipe section in such a way that exhaust gas flowing from the open end of the first exhaust gas line pipe section may flow through the opening in the cylinder lateral surface of the second exhaust gas line pipe section, in an at least approximately vertical direction with respect to a longitudinal extent of the second exhaust gas line pipe section, into the second exhaust gas line pipe section. Thus, the connecting point of the first exhaust gas line pipe section to the second exhaust gas line pipe section is directly followed by a deflection of the main flow direction of the exhaust gas enriched with the reducing agent by at least approximately 90 degrees, resulting in turbulence of the exhaust gas and good intermixing of the reducing agent in the exhaust gas. The opening in the cylinder lateral surface of the second exhaust gas line pipe section has a larger extension in the direction of the longitudinal extent of the second exhaust gas line pipe section than transversely with respect to the longitudinal extent. The opening preferably has an oval or ellipsoidal shape. However, an approximately rectangular cutout may also be provided in the cylinder lateral surface. The longitudinal extension is preferably approximately 1.5 to 4 times greater than the transverse extension. The design of a particularly stable rotating exhaust gas vortex in the second exhaust gas line pipe section is made possible due to this embodiment. This in turn allows a short design of the second exhaust gas line pipe section and a short line length to the subsequent exhaust emission control unit, and thus a compact construction of the exhaust gas system having a short reducing agent preparation section. Due to the turbulence and the resulting intermixing, a separate mixer for distributing reducing agent introduced into the exhaust gas may advantageously be dispensed with in the reducing agent preparation section, and resulting pressure loss may advantageously be avoided. The injector unit is preferably designed in such a way that it is able to spray or inject the reducing agent, which is preferably present as a liquid, into the exhaust gas in finely atomized form.

The edge contour of the open end of the first exhaust gas line pipe section preferably corresponds to the edge contour of the opening in the cylinder lateral surface of the second exhaust gas line pipe section, and the positive-fit connection of the two exhaust gas line pipe sections, which is established by welding, for example, is provided along this contour. The first exhaust gas line pipe section preferably ends on the cylinder lateral surface of the second exhaust gas line pipe section, and therefore does not protrude into the interior of the second exhaust gas line pipe section. The opening in the cylinder lateral surface of the second exhaust gas line pipe section is directly adjacent to, or situated at a short distance of preferably a few millimeters from, the end-side closure of the second exhaust gas line pipe section, thus avoiding flow-related dead zones. For closing the second exhaust gas line pipe section at its first end, a lid having a flat design and which covers the line cross-section may be provided, the normal direction of the lid being the same as the direction of the cylinder axis of the second exhaust gas line pipe section. The cross-sectional areas of the first exhaust gas line pipe section and of the second exhaust gas line pipe section are at least approximately equal, at least in the region of their connecting point, but differ from one another preferably by less than a factor of 1.5. Exhaust gas flowing from the open end of the second exhaust gas line pipe section is preferably supplied to a catalytic exhaust emission control unit such as an SCR catalytic converter, a hydrolysis catalytic converter, an oxidation catalytic converter, a nitrogen oxides storage catalytic converter, or a particle filter.

In one embodiment of the invention, the injector unit is situated at a short distance upstream from the connecting point of the first exhaust gas line pipe section to the second exhaust gas line pipe section. The distance is preferably less than one diameter of one of the exhaust gas line pipe sections, in particular less than one-half or one-third diameter. The construction volume of the reducing agent preparation section or the line lengths that conduct the reducing agent and that are used for the reducing agent preparation may thus be kept particularly small.

In another embodiment of the invention, at least one plate-shaped baffle element is situated at a short distance upstream from the connecting point of the first exhaust gas line pipe section to the second exhaust gas line pipe section within the first exhaust gas line pipe section, and reducing agent introduced into the first exhaust gas line pipe section by means of the injector unit strikes the baffle element. The plate-shaped baffle element acts as an evaporation element. The heat energy necessary for evaporating the liquid reducing agent, preferably present in the form of small droplets, is preferably absorbed by heat exchange with the counter-flowing exhaust gas. However, separate heating of the baffle element may also be provided. The impact of the droplets of reducing agent against the heated baffle element results in at least partial evaporation of the reducing agent, in addition to further diminution of the droplet size of rebounding droplets of reducing agent. As a result, distribution of the reducing agent in the exhaust gas is improved compared to a reducing agent that is present predominantly in droplet form. In addition, the evaporation process is improved due to the heat transfer from the evaporator plate to the rebounded reducing agent, which is enhanced compared to heat transfer solely from the exhaust gas. Further shortening of the reducing agent preparation section is made possible due to the at least partial evaporation of the reducing agent which already takes place at the baffle element. The baffle element is preferably situated directly above or in front of the opening in the cylinder lateral surface of the second exhaust gas line pipe section. The end of the baffle element facing the second exhaust gas line pipe section may be situated, for example, in the opening area, or offset thereto by several millimeters, at best a few centimeters, in the direction of the first exhaust gas line pipe section. The baffle element may be designed as a metal sheet that is flat or provided with surface-enlarging embossing. The metal sheet may also have a slit or perforated design, and may be provided with a coating which promotes urea hydrolysis or reduces formation of deposits, or may be roughened.

In a preferred further embodiment, the baffle element has an at least approximately flat design, a normal vector of the baffle element plane being oriented at least approximately perpendicularly with respect to the exhaust gas flow direction. Thus, a directional vector of the exhaust gas flow direction is situated approximately in the plane of the baffle element, thereby making a low flow resistance possible. The direction of the normal vector is preferably oriented at least approximately parallel to the direction of the cylinder axis of the second exhaust gas line pipe section in the area of the opening in its cylinder lateral surface.

In another embodiment of the invention, the evaporation rate of reducing agent introduced into the exhaust gas by the injector unit may be further increased by providing a plurality of baffle elements. The baffle elements are preferably oriented parallel to one another, in particular in alignment one behind the other, and situated above the opening in the cylinder lateral surface of the second exhaust gas line pipe section. Two to eight baffle elements may be provided, depending on the size of the opening in the cylinder lateral surface of the second exhaust gas line pipe section. Four baffle elements are preferably provided. With regard to the atomizing cone of the reducing agent that is delivered by the injector unit, the baffle elements are situated in such a way that each is at least partially surrounded by the atomizing cone, and therefore may contribute to the evaporation of the reducing agent. For this purpose, it is preferred for the surface area extension of the baffle elements to be selected to be different. In this regard, it is particularly preferred when the surface area of the baffle elements increases with increasing distance from the injector unit. Viewed in the direction of the surface normals, in this embodiment a baffle element covers only a portion of the surface area of the adjacent, subsequent baffle element.

In another embodiment of the invention, a cylinder axis of the first exhaust gas line pipe section is oriented toward a central region of a cross-sectional area of the second exhaust gas line pipe section in the region of the connecting point to the second exhaust gas line pipe section. The supply of the exhaust gas, enriched with the reducing agent, into the second exhaust gas line pipe section thus takes place centrally, so to speak, into the second exhaust gas line pipe section. As a result of this embodiment, two counter-rotating exhaust gas flow vortices are formed within the second exhaust gas line pipe section. This allows particularly good intermixing of the reducing agent in the exhaust gas. In addition, the actual exhaust gas flow path is enlarged with respect to the geometric length of the second exhaust gas line pipe section. Evaporation of droplets of reducing agent remaining in the exhaust gas is thus improved. In the case of urea as reducing agent, the hydrolysis or thermolysis of the urea is also improved.

In another embodiment of the invention, the distribution of the reducing agent in the exhaust gas may be further improved when the second exhaust gas line pipe section has an oval cross-sectional shape in the area of the opening in the cylinder lateral surface. In this case, two counter-rotating exhaust gas flow vortices form which in each case have an approximately circular shape in a top view. The exhaust gas flow vortices are particularly stable as a result.

In another embodiment of the invention, a cylinder axis of the first exhaust gas line pipe section is oriented toward an eccentric region of a cross-sectional area of the second exhaust gas line pipe section in the region of the connecting point to the second exhaust gas line pipe section. The exhaust gas is thus introduced into the second exhaust gas line pipe section eccentrically, in particular approximately tangentially, with respect to same. The design of an exhaust gas flow vortex that practically surrounds the entire cross-section is made possible in conjunction with a circular cross-sectional shape of the second exhaust gas line pipe section, which is preferably provided for this purpose, in the area of the opening.

The method according to the invention for preparing a reducing agent introduced into a first exhaust gas line pipe section of an exhaust gas system of an internal combustion engine provides that the introduced reducing agent is at least partially evaporated at an evaporator unit situated in the first exhaust gas line pipe section, and together with the exhaust gas of the internal combustion engine subsequently flows through an opening in a cylinder lateral surface of a second exhaust gas line pipe section into the second exhaust gas line pipe section in a direction that is oriented at least approximately perpendicularly with respect to an axial direction of the second exhaust gas line pipe section, a rotating exhaust gas flow being formed within the second exhaust gas line pipe section. Due to the at least partial evaporation made possible by the evaporator unit, particularly good preparation of the reducing agent may be achieved in conjunction with the subsequent turbulence after supplying the exhaust gas into the second exhaust gas line pipe section. The line length of the reducing agent preparation section may thus be kept short, and a compact construction is made possible.

In one embodiment of the method, a plurality of evaporator plates is provided as the evaporator unit, and the reducing agent is injected into the first exhaust gas line pipe section in such a way that it strikes all the evaporator plates. The evaporation of the reducing agent is thus improved, and a particularly high evaporation rate is achieved when the reducing agent is injected into the first exhaust gas line pipe section at a maximum acute angle with respect to a normal direction of the evaporator plates. The reducing agent is thus injected in such a way that it strikes the evaporator plates at least approximately perpendicularly, thus achieving good wetting of the evaporator plate surfaces. The angle of impact of injected reducing agent on an evaporator plate is preferably less than 45 degrees with respect to the normal direction of the evaporator plate.

In another embodiment of the method, in addition it is preferred for the reducing agent to be injected into the first exhaust gas line pipe section at least approximately perpendicularly with respect to an exhaust gas flow.

In another embodiment of the method, the exhaust gas flowing into the second exhaust gas line pipe section forms two counter-rotating vortices, viewed in an axial direction of the second exhaust gas line pipe section. Particularly effective and uniform intermixing of the reducing agent in the exhaust gas is thus made possible. The aim is to achieve a stable vortex formation that is preferably maintained, at least in part, until reaching the inlet side of an emission exhaust control component downstream from the turbulence mixing section or the housing inlet funnel of the emission exhaust control component which may be provided. This may be achieved in particular by providing an oval cross-sectional shape of the second exhaust gas line pipe section for forming two counter-rotating vortices having an at least approximately circular shape.

BRIEF DESCRIPTION OF THE DRAWING FIGURES

Further advantages, features, and particulars of the invention result from the following description of preferred exemplary embodiments and with reference to the drawings. The features and feature combinations mentioned above in the description as well as the features and feature combinations mentioned below in the description of the figures and/or only shown in the figures may be used not only in the particularly stated combination, but also in other combinations or alone without departing from the scope of the invention. The figures show the following.

DETAILED DESCRIPTION

Figure 1:
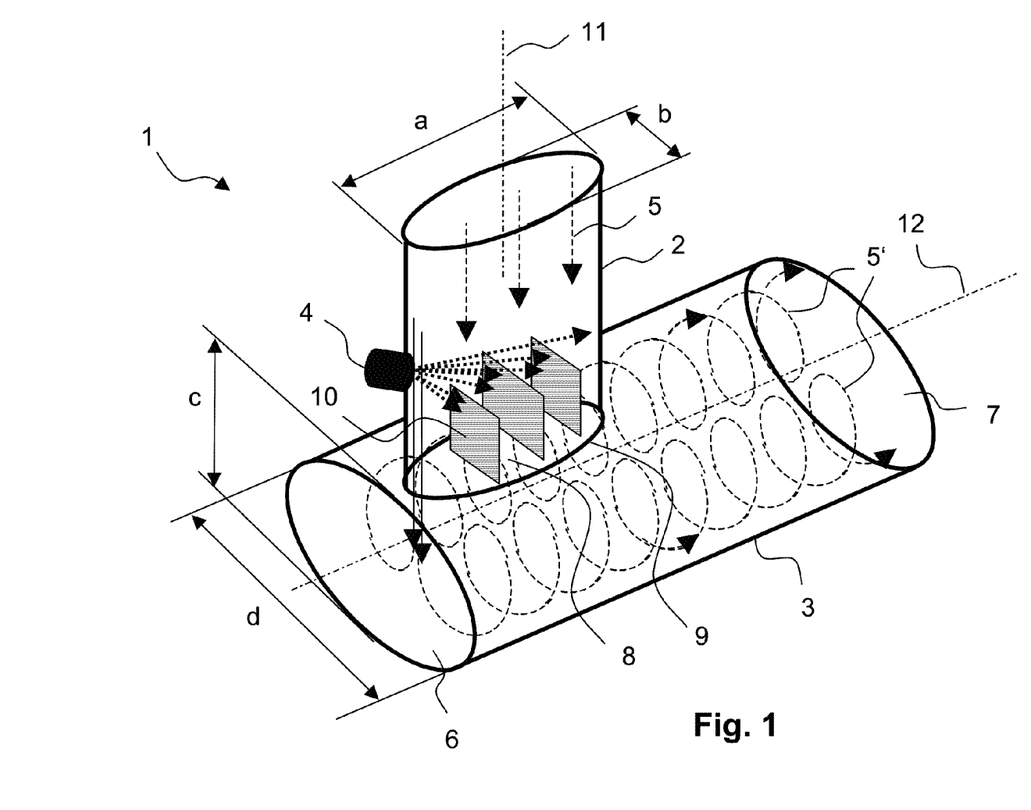
FIG. 1 shows a schematic illustration of a partial section of the exhaust gas system according to the invention which forms a reducing agent preparation section.

The partial section of the exhaust gas system according to the invention schematically illustrated in FIG. 1 forms a reducing agent preparation section 1 for reducing agent to be introduced into the exhaust gas system. The reducing agent preparation section 1 has a first cylindrical exhaust gas line pipe section 2, which with its outlet-side open end 9 opens into a second cylindrical exhaust gas line pipe section 3. The mouth opening is situated at an opening 8 in the cylinder lateral surface of the second exhaust gas line pipe section 3. At the mouth opening, the first exhaust gas line pipe section 2 at its open end 9 is connected along its edge contour to the edge contour of the opening 8 in the cylinder lateral surface of the second exhaust gas line pipe section 3 in a butt-jointed, positive-fit, and integrally bonded manner.

In the present case, the cross-section of the first exhaust gas line pipe section 2 as well as the cross-section of the second exhaust gas line pipe section 3 at the location of the mouth opening have an oval or elliptical shape. Accordingly, the opening 8 also has an oval or elliptical shape, the longer axis of the elliptically shaped opening 8 being oriented parallel to the cylinder axis 12 of the second exhaust gas line pipe section 3. The longer extension a of the elliptical opening 8 extending in the direction of the cylinder axis 12 of the second exhaust gas line pipe section 3, and thus also of the first exhaust gas line pipe section 2 at the connection of the first exhaust gas line pipe section 2 and the second exhaust gas line pipe section 3, is therefore larger than the transverse extension b oriented perpendicularly thereto. The ratio a/b is preferably in the range of 1.5 to 4.

Corresponding to the at least approximately perpendicular mouth opening of the first exhaust gas line pipe section 2 into the second exhaust gas line pipe section 3, the shorter axis b of the elliptical opening 8 or of the first exhaust gas line pipe section 2 at the location of the mouth opening is oriented at least approximately parallel to the larger cross-sectional axis d of the second elliptical exhaust gas line pipe section 3. The shorter axis c of the elliptical cross-sectional area of the second exhaust gas line pipe section 3 at the location of the mouth opening is therefore oriented parallel to the cylinder axis 11 of the first exhaust gas line pipe section 2. The ratio d/c of the longer cross-sectional axis d to the shorter cross-sectional axis c of the second exhaust gas line pipe section 3 is preferably in the range of 1.5 to 2. The shorter transverse dimension b of the opening 8 is preferably smaller than the shorter cross-sectional axis c of the second exhaust gas line pipe section 3. For displacement values of the internal combustion engine in the range of approximately 1.6 liters to 3.5 liters, the shorter cross-sectional axis c is preferably selected to be in the range of 30 mm to 100 mm.

Exhaust gas from an internal combustion engine, in particular a diesel engine (not illustrated), flows from an exhaust emission control unit, preferably an oxidation catalytic converter (likewise not illustrated in FIG. 1), into and through the first exhaust gas line pipe section 2. The exhaust gas flow direction, which is at least approximately parallel to the cylinder axis 11 of the first exhaust gas line pipe section 2, is illustrated by dashed-line arrows 5. While flowing through the first exhaust gas line pipe section 2, the exhaust gas is enriched with a reducing agent, preferably a solution of a substance that is capable of splitting ammonia. In the following discussion, without limiting universality, it is assumed that the reducing agent is an aqueous urea solution. The exhaust gas is enriched with aqueous urea solution by injection into the second exhaust gas line pipe section 3 by means of an injector unit 4 situated at the first exhaust gas line pipe section 2 near the mouth opening of the first exhaust gas line pipe section 2. The distance of the injector unit 4 from the connecting point of the exhaust gas line pipe sections 2, 3 is preferably much smaller than the longer cross-sectional dimension a, and is particularly preferably smaller than the shorter cross-sectional dimension b of the first exhaust gas line pipe section 2.

As illustrated by dotted-line arrows, injected reducing agent strikes baffle elements 10, which act as evaporator plates, situated above the opening 8 in the cylinder lateral surface of the second exhaust gas line pipe section 3. Liquid reducing agent that has evaporated or rebounded from the evaporator plates is surrounded and entrained by the exhaust gas flow. Particulars of the injection and evaporation of reducing agent as well as the design, configuration, and function of the baffle elements are discussed in greater detail below.

Exhaust gas combined with aqueous urea solution then flows essentially in the vertical direction with respect to the cylinder axis 12 of the second exhaust gas line pipe section 3, into and through the opening 8. Exhaust gas flowing into the second exhaust gas line pipe section 3 passes through same and flows out from an open end 7. At the open end, an emission exhaust control component, not illustrated, is connected to the second exhaust gas line pipe section 3, preferably via an inlet funnel. The emission exhaust control component is preferably a component which acts catalytically and/or by filtration. A housing in which a particle filter is accommodated is preferably connected to the open end 7 of the second exhaust gas line pipe section 3.

The second exhaust gas line pipe section 3 has a closed end 6 opposite from the open end 7. For this purpose a flat closure lid, for example, may be welded on. Exhaust gas flowing from the first exhaust gas line pipe section 2 into and through the opening 8 in the cylinder lateral surface of the second exhaust gas line pipe section 3 is thus deflected in its main flow direction by approximately 90°. It is preferably provided that the end of the opening 8 upstream with respect to the deflected main flow direction of the exhaust gas directly adjoins the closed end 6 or is at least situated near same. The formation of a flow-related dead zone at the closed end 6 of the second exhaust gas line pipe section 3 is thus avoided.

Exhaust gas flowing into the second exhaust gas line pipe section 3 strikes an area of the inner wall of the second exhaust gas line pipe section 3 opposite from the opening 8, and is deflected. This results, in particular due to the elliptical tube cross-sectional shape, in two counter-rotating vortices, as illustrated by the dashed-line arrows 5'. The formation of two counter-rotating exhaust gas vortices has proven to be very advantageous with regard to the preparation of the reducing agent. On the one hand a uniform distribution of liquid reducing agent, which may be present predominantly in the form of small droplets, and in particular, in the form of already evaporated reducing agent, is improved. On the other hand, the evaporation of aqueous urea solution is significantly improved by the turbulence. Lastly, release of ammonia by thermolysis and/or hydrolysis is improved. In addition, as a result of the exhaust gas striking the tube inner wall opposite from the opening 8, droplets present in the exhaust gas are further broken up, thus facilitating their subsequent evaporation. To the extent that wetting of the tube inner wall occurs, the wetted tube surface also acts as an evaporation surface, thus further improving the evaporation of the aqueous urea solution.

Figure 2:
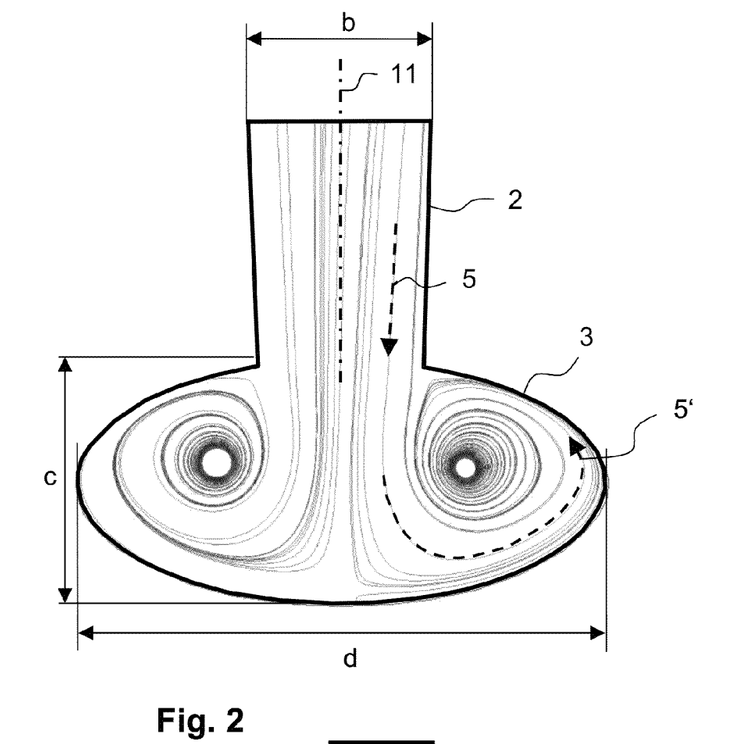
FIG. 2 shows a schematic illustration of an exhaust gas flow pattern in the reducing agent preparation section according to FIG. 1.

A flow pattern obtained from a computerized flow simulation is illustrated in FIG. 2 for explaining the double vortex formation. The flow pattern shows flow lines in a top view of a detail of the reducing agent preparation section 1 in the direction of the cylinder axis 12 of the second exhaust gas line pipe section 3. As is apparent, two vortex flows form in the second exhaust gas line pipe section 3 that counter-rotate approximately about a respective focal point of the elliptical cross-sectional area, the vortex flows increasingly approximating an ideal circular shape with decreasing diameter. As has been determined by the inventors, with a view to sought stability of the vortices it is advantageous for the vortices to have an approximately circular shape. This may be achieved in particular in that the longer axis d of the elliptical cross-sectional area of the second exhaust gas line pipe section 3 is approximately twice as large as the shorter axis c. As illustrated in FIG. 2, it may also be provided that the shorter cross-sectional dimension b of the first exhaust gas line pipe section 2 increases with increasing distance from the connecting point of the two exhaust gas line pipe sections 2, 3. A continuous transition to the larger dimensions of an optionally provided inlet funnel for a connected exhaust emission control element may be achieved in this way. The same of course applies for the other cross-sectional dimensions a, c, and d.

Figure 3:
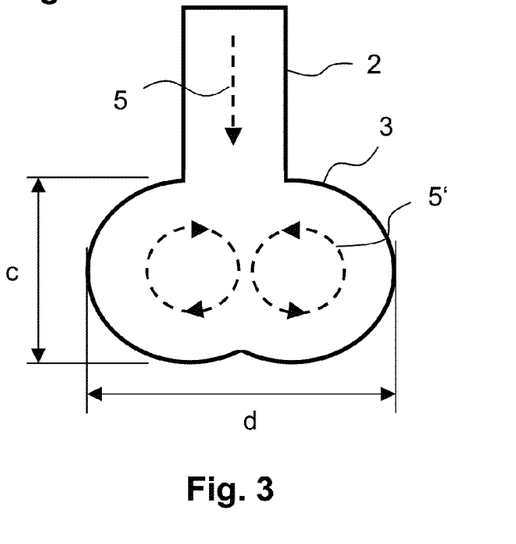
FIG. 3 shows a schematic illustration of another advantageous embodiment of a partial section of the exhaust gas system according to the invention, analogous to FIG. 1, which forms a reducing agent preparation section.

In order to form exhaust gas vortices approximating a circular shape to the greatest extent possible, a cross-sectional shape of the second exhaust gas line pipe section 3 may also be selected that corresponds to two contiguous circular segments, as roughly illustrated in schematic form in FIG. 3. The cross-sectional dimensions of the exhaust gas line pipe sections 2, 3 are generally selected in such a way that a double vortex is formed in conjunction with the prevailing exhaust gas mass flow in the second exhaust gas line pipe section 3, the double vortex being at least approximately maintained along a line length of greater than 200 mm, preferably greater than 300 mm. In any case, a double vortex is preferably maintained until a downstream exhaust emission control element or an exhaust gas inlet funnel provided for this purpose is reached. For the latest possible break-up of the generated vortex structure, the cross-sectional dimensions are selected in such a way that a swirl number of the exhaust gas of at least 0.3 for each individual vortex is achieved, at least in the area of the exhaust gas inlet in the second exhaust gas line pipe section 3. In particular the cross-sectional dimensions a, b, c, d of the exhaust gas line pipe sections 2, 3 can be designed as a function of the displacement of the internal combustion engine in such a way that an inlet swirl number of at least 0.3 is achieved.

The advantages of the embodiments of the reducing agent preparation section 1 explained above may optionally also be achieved using modified cross-sectional shapes of the exhaust gas line pipe sections 2, 3 and with altered cross-sectional geometries and changed flow conditions. However, the swirl-generating properties must be essentially maintained. An embodiment that is likewise preferred in this sense is illustrated in FIG. 4; only the important differences from the embodiments explained above are addressed in the following discussion.

Figure 4:
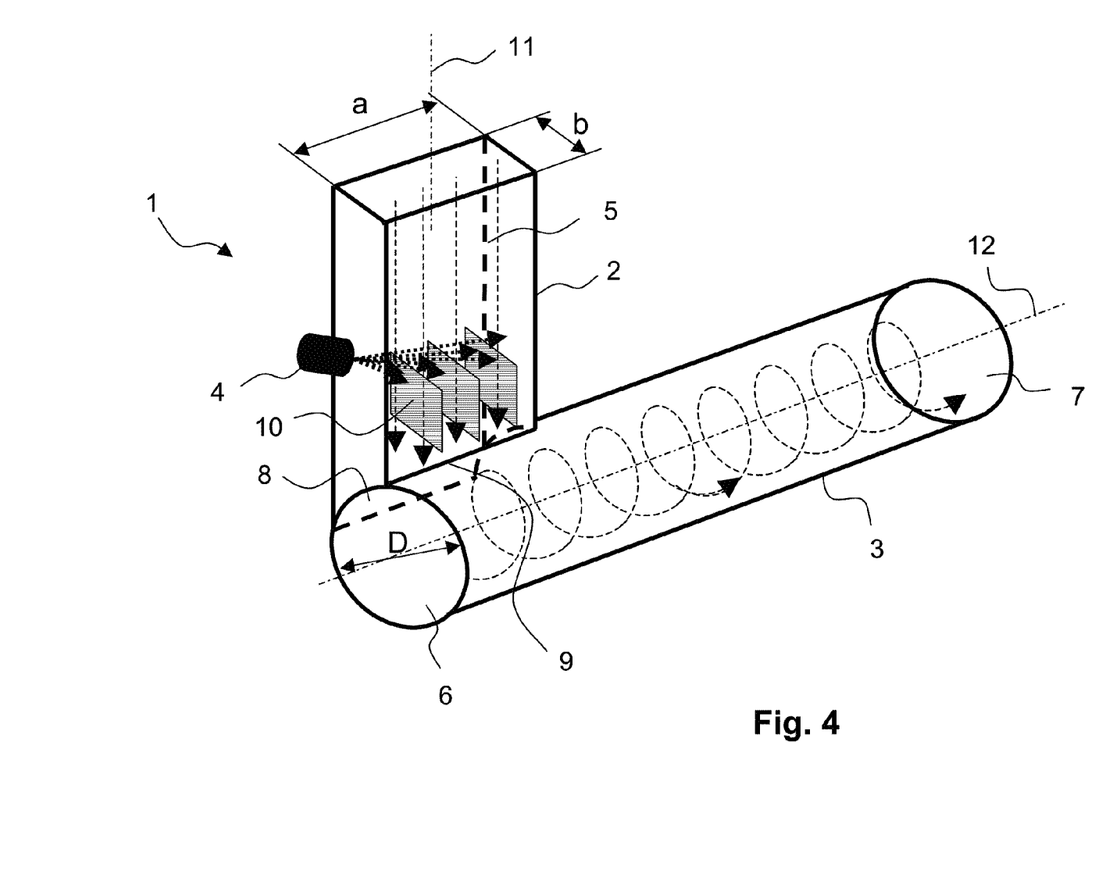
FIG. 4 shows a schematic illustration of another advantageous embodiment of a partial section of the exhaust gas system according to the invention which forms a reducing agent preparation section.

The advantageous further embodiment of a reducing agent preparation section 1 of the exhaust gas system according to the invention illustrated in FIG. 4 differs from the embodiment illustrated in FIG. 1 essentially by a tangential supplying of exhaust gas from the first exhaust gas line pipe section 2 into the second exhaust gas line pipe section 3. For this purpose, the first exhaust gas line pipe section 2 is situated eccentrically with respect to the second exhaust gas line pipe section 3. Thus, exhaust gas flowing into the second exhaust gas line pipe section 3 is not oriented toward a central region of the cross-sectional area of the second exhaust gas line pipe section 3, but, rather, toward a decentralized region. Exhaust gas enriched with aqueous urea solution thus flows into the second exhaust gas line pipe section 3, approximately tangentially with respect to same.

In the present embodiment, the second exhaust gas line pipe section 3 has a circular cross-section, for which reason a single vortex, as illustrated, is formed instead of a double vortex. The diameter D of the second exhaust gas line pipe section 3 is preferably in the range of the cross-sectional dimensions c and d of the elliptical embodiment illustrated in FIG. 1. The diameter D is preferably in the range of 30 mm to 150 mm for typical sizes of motor vehicle engines.

Furthermore, in the present case the cross-sectional shape of the first exhaust gas line pipe section is selected to be rectangular. The statements made for the embodiment in FIG. 1 regarding the dimensions as well as the vorticity of the exhaust gas vortex formed in the second exhaust gas line section 3 also apply here. The longer side a of the cross-section of the first exhaust gas line pipe section 2 at the connecting point of the exhaust gas line pipe sections 2, 3 is preferably selected to be at least twice as large as the diameter D of the second exhaust gas line pipe section. The ratio a/D is particularly preferably selected to be in the range of 1.5 to 3. It is understood that a rectangular cross-section of the first exhaust gas line pipe section may also be provided in the embodiment in FIG. 1.

The evaporator unit provided according to the invention upstream from the connecting point of the first exhaust gas line pipe section 2 and the second exhaust gas line pipe section 3 is discussed below. For this purpose, reference is made to FIG. 1, whereby the explanations likewise apply to the embodiment of the reducing agent preparation section 1 illustrated in FIG. 4.

The evaporator unit has at least one, but preferably up to eight, baffle elements 10. Three baffle elements 10 are illustrated in FIG. 4 strictly by way of example. The baffle elements 10, which also function as evaporator plates, are designed as flat metal sheets whose normal direction is oriented at least approximately perpendicularly with respect to the cylinder axis 11 of the first exhaust gas line pipe section 2, and thus with respect to the exhaust gas flow direction. The baffle elements 10 are preferably situated equidistantly from one another. Due to this flow-optimized orientation, the baffle elements 10 cause little or no flow resistance. A downstream end of the baffle elements 10 is preferably situated in the plane of the opening 8 in the cylinder lateral surface of the second exhaust gas line pipe section 3, or is offset by only a few millimeters with respect to the exhaust gas flow direction. An upstream end of the baffle elements 10 is located essentially at the level of the injector unit 4 situated at the first exhaust gas line pipe section 2. The injector unit 4 is situated in such a way that it is able to spray aqueous urea solution approximately perpendicularly with respect to the cylinder axis 11. However, a slight inclination of the spray direction in the exhaust gas flow direction may be provided. Aqueous urea solution sprayed from the injector unit 4 thus strikes the baffle elements 10 approximately perpendicularly, but at best, at an acute angle with respect to the normal direction of the planes of the baffle elements.

Droplets of aqueous urea solution striking the baffle elements 10 rebound from the baffle elements or wet their surface with subsequent evaporation, depending on the temperature of the baffle elements 10. Both processes assist with a distribution of aqueous urea solution in the exhaust gas. Rebounding by droplets striking the baffle elements 10 occurs primarily when the temperature of the baffle elements 10 is above the Leidenfrost temperature. It has been shown that the rebounding droplets have a smaller size than impacting droplets, thus improving their distribution. In addition, upon further transport of the exhaust gas enriched with aqueous urea solution, the droplets further impact the tube inner wall opposite from the opening 8 in the second exhaust gas line pipe section 3. This results in repeated rebounding with further diminution of droplet size, or evaporation of an additional portion of the aqueous urea solution supplied to the exhaust gas.

Figure 5A:
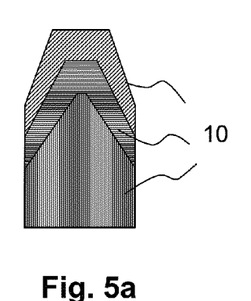
FIG. 5 shows advantageous embodiments of baffle elements of the exhaust gas system according to the invention.

To optimize the preparation of aqueous urea solution at the baffle elements 10 to the greatest extent possible, the baffle elements are configured or situated with respect to the spray direction of the injector unit 4 in such a way that that all baffle elements 10 and preferably also the inner wall of the first exhaust gas line pipe section 2 opposite from the injector unit 4 are at least partially surrounded and wetted by the spray jet or atomizing cone. For this purpose, it is advantageous to offset the baffle elements 10 with respect to one another, viewed in the exhaust gas flow direction, in such a way that their upstream and/or downstream ends are increasingly displaced with respect to the exhaust gas flow direction with increasing distance of the baffle elements 10 from the injector unit 4. An increasing length of the baffle elements, i.e., an increasing extension of the baffle elements 10 in and/or opposite to the exhaust gas flow direction, may be provided with increasing distance from the injector unit 4. One example of such advantageous staggering is schematically illustrated in FIG. 5a. As shown in FIG. 5a, the size of the surface area of the baffle elements 10 may likewise increase with increasing distance of the baffle elements 10 from the injector unit 4. The portion of the sprayed aqueous urea solution striking the baffle elements 10, which are at a farther distance from the injector unit 4, may thus be increased, thereby improving the preparation effect of these "rear" baffle elements 10. As illustrated in FIG. 5a, an increasing width of the baffle elements 10 may also be provided, at least in places, in or opposite to the exhaust gas flow direction. With regard to the evaporation of injected aqueous urea solution which according to the invention is provided prior to exhaust gas swirling, and which is assisted to a large extent by the baffle elements 10, it is also pointed out that it is preferably provided that the inner wall of the first exhaust gas line pipe section 2 opposite from the injector unit 4 is also surrounded and wetted by the spray jet or atomizing cone. The wetted surface of the tube inner wall thus acts as an additional evaporation surface, whereby rebounding of striking liquid droplets may take place here as well.

Figure 5B:
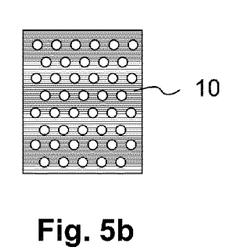
Figure 5C:
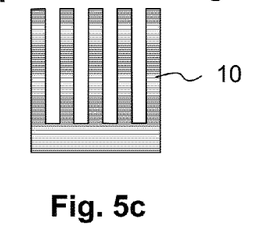

A further improvement in the evaporative effect of the baffle elements 10 may be achieved when their surface has openings. FIG. 5b illustrates an example of a perforated embodiment. FIG. 5c schematically shows a slit shape. It is advantageous when the openings in the baffle element surface constitute approximately 5% to approximately 50% of the total surface area. In addition, a surface formation of the baffle elements in the form of knobs, for example, may be provided. Additionally or alternatively, roughening and/or a coating may be provided. A preferred value for surface roughness is in the range of 5 μm to 50 μm. A catalytic coating for assisting in thermolysis and/or hydrolysis of urea may be provided as a coating. A coating may also be provided which additionally or alternatively counteracts formation of deposits of decomposition products of urea.

The reducing agent preparation section 1 allows extremely effective reducing agent preparation, in particular due to synergistic interactions of spraying and evaporation with subsequent flow direction deflection in combination with vortex formation. An effective release of ammonia, and at the same time particularly good uniform distribution with short line lengths, are achieved when aqueous urea solution is used as reducing agent. In addition, the reducing agent preparation section 1 is characterized by a particularly low flow resistance. An additional built-in element for intermixing or swirl generation, such as a static mixer upstream from and in particular downstream from the supplying of aqueous urea solution into the exhaust gas, may be dispensed with. The reducing agent preparation section 1, which is designed as illustrated and described, thus allows a particularly compact design of the exhaust gas system according to the invention, even with a complex construction. Thus, even exhaust gas systems having a complex design may be accommodated in a vehicle engine compartment completely, or at least for the most part, with regard to components that are effective in exhaust emission control. In particular, an arrangement in the engine compartment at the side of the engine block is made possible, as the result of which advantages with regard to the thermal properties of the exhaust emission control system may be achieved. This is explained below with reference to FIG. 6.

Figure 6:
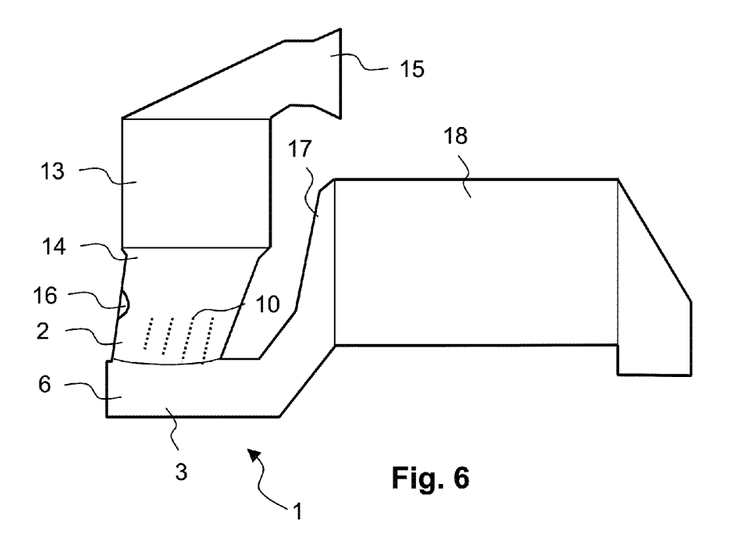
FIG. 6 shows an illustration of a partial region of the exhaust gas system according to the invention, having exhaust gas aftertreatment components which are connected by a reducing agent preparation section.

FIG. 6 illustrates a compact exhaust gas aftertreatment system in which two housings 13, 18 for exhaust gas aftertreatment components are connected to one another via the reducing agent preparation section 1. In the present case, an oxidation catalytic converter is situated in an upstream housing 13. A particle filter and an SCR catalytic converter situated at a small distance therefrom are situated one behind the other in a downstream housing 18 in the present case, the particle filter preferably being provided with an SCR catalyst coating. An exhaust gas inlet funnel 15 of the upstream housing 13 receives exhaust gas from a diesel engine, not illustrated, and for this purpose is preferably connected to an exhaust gas turbocharger outlet, likewise not illustrated. Exhaust gas which is treated by the oxidation catalytic converter is supplied from the housing 13 to the first exhaust gas line pipe section 2 of the reducing agent preparation section 1 via a housing outlet funnel 14. Aqueous urea solution is injected into the exhaust gas in the first exhaust gas line pipe section 2 by means of an injector unit, not illustrated, which is provided at a connection 16. Due to the particularly effective preparation described above, the supply line for urea- or ammonia-containing exhaust gas to the housing 18 may have a particularly short design. As is apparent, the described exhaust gas deflection by approximately 90° during the transition of the first exhaust gas line pipe section 2 to the second exhaust gas line pipe section 3 allows a particularly compact construction of the exhaust gas aftertreatment system. Heat and pressure losses are minimized, which allows particularly efficient exhaust emission control. A design of the exhaust gas system according to the invention, in which, as illustrated in FIG. 6, the upstream housing 13 is oriented at least approximately vertically, and the downstream housing 18, which immediately downstream is connected to the housing 13 via the reducing agent preparation section 1, is oriented at least approximately horizontally, has proven to be particularly advantageous and compact. In particular, an arrangement in which the downstream housing 18 is situated, at least partially, at the same geodetic height as the upstream housing 13 is particularly compact and space-saving. It is particularly preferred when the center axis of the housing 18 has a geodetic height which is at least approximately equal to or even greater than the downstream end of the housing 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An exhaust gas system of an internal combustion engine, comprising:
    a first cylindrical exhaust gas line pipe section; and
    a second cylindrical exhaust gas line pipe section, wherein
        an injector unit configured to introduce a reducing agent into exhaust gas flowing through the first exhaust gas line pipe section is situated at the first exhaust gas line pipe section,
        the second exhaust gas line pipe section has a cylinder lateral surface, a closed first end, an open second end, and an opening in the cylinder lateral surface adjacent to the closed end, wherein the second exhaust gas line pipe section has an oval cross-sectional shape in an area of the opening in the cylinder lateral surface,
        an open end of the first exhaust gas line pipe section is connected in a positive-fit manner to the second exhaust gas line pipe section in such a way that exhaust gas flowing from the open end of the first exhaust gas line pipe section flows through the opening in the cylinder lateral surface of the second exhaust gas line pipe section, vertically with respect to a longitudinal extent of the second exhaust gas line pipe section, into the second exhaust gas line pipe section, and
        the opening in the cylinder lateral surface of the second exhaust gas line pipe section has a larger extension in a direction of the longitudinal extent of the second exhaust gas line pipe section than transversely thereto.

2. The exhaust gas system of claim 1, wherein the injector unit is situated at a short distance upstream from the connecting point of the first exhaust gas line pipe section to the second exhaust gas line pipe section, wherein the short distance is less than one diameter of the first exhaust gas line pipe section or of the second exhaust gas line pipe section.

3. The exhaust gas system of claim 1, wherein at least one plate-shaped baffle element is situated within the first exhaust gas line pipe section at a short distance upstream from the connecting point of the first exhaust gas line pipe section to the second exhaust gas line pipe section, wherein the short distance is less than one diameter of the first exhaust gas line pipe section or of the second exhaust gas line pipe section, and wherein the at least one plate-shaped baffle element is arranged so that reducing agent introduced into the first exhaust gas line pipe section by the injector unit strikes the at least one plate-shaped baffle element.

4. The exhaust gas system of claim 3, wherein the at least one plate-shaped baffle element is situated directly above or in front of the opening in the cylinder lateral surface of the second exhaust gas line pipe section.

5. The exhaust gas system of claim 4, wherein a cylinder axis of the first exhaust gas line pipe section is oriented toward a central region of a cross-sectional area of the second exhaust gas line pipe section in a region of the connecting point to the second exhaust gas line pipe section.

6. The exhaust gas system of claim 3, wherein the at least one plate-shaped baffle element is flat, and wherein a normal vector of the baffle element plane is oriented perpendicularly with respect to a direction of the exhaust gas flow.

7. The exhaust gas system of claim 3, wherein the at least one plate-shaped baffle element comprises a plurality of baffle elements.

8. The exhaust gas system of claim 7, wherein a surface area extension of the plurality of baffle elements is different.

9. The exhaust gas system of claim 1, wherein a cylinder axis of the first exhaust gas line pipe section is oriented toward a central region of a cross-sectional area of the second exhaust gas line pipe section in a region of the connecting point to the second exhaust gas line pipe section.

10. A method for preparing a reducing agent, the method comprising:
    introducing the reducing agent into a first exhaust gas line pipe section of an exhaust gas system of an internal combustion engine;
    at least partially evaporating the introduced reducing agent by an evaporator unit situated in the first exhaust gas line pipe section;
    subsequently flowing the at least partially evaporated reducing agent together with exhaust gas of the internal combustion engine through an opening in a cylinder lateral surface of a second exhaust gas line pipe section into the second exhaust gas line pipe section perpendicularly with respect to an axial direction of the second exhaust gas line pipe section, wherein the exhaust gas flowing into the second exhaust gas line pipe section forms two counter-rotating vortices, viewed with respect to an axial direction of the second exhaust gas line pipe section.

11. The method of claim 10, wherein a swirl number of the exhaust gas of at least 0.3 for the two vortices is achieved, at least in an area of the exhaust gas inflow in the second exhaust gas line pipe section.

12. The method of claim 11, wherein the evaporator unit is a plurality of evaporator plates, and the reducing agent is injected into the first exhaust gas line pipe section in such a way that it strikes all the plurality of evaporator plates.

13. The method of claim 10, wherein the evaporator unit is a plurality of evaporator plates, and the reducing agent is injected into the first exhaust gas line pipe section in such a way that it strikes all the plurality of evaporator plates.

14. The method of claim 13, wherein the reducing agent is injected into the first exhaust gas line pipe section at the most with an acute angle with respect to a normal direction of the plurality of evaporator plates.

15. The method of claim 10, wherein the reducing agent is injected into the first exhaust gas line pipe section perpendicularly with respect to an exhaust gas flow.

* * * * *